US008919955B2

(12) United States Patent
Hsieh et al.

(10) Patent No.: US 8,919,955 B2
(45) Date of Patent: Dec. 30, 2014

(54) VIRTUAL GLASSES TRY-ON METHOD AND APPARATUS THEREOF

(71) Applicant: Ming Chuan University, Taipei (TW)

(72) Inventors: Chaur-Heh Hsieh, Taipei (TW); Wan-Yu Huang, Taipei (TW); Jeng-Sheng Yeh, Taipei (TW)

(73) Assignee: Ming Chuan University, Taipei (TW)

( * ) Notice: Subject to any disclaimer, the term of this patent is extended or adjusted under 35 U.S.C. 154(b) by 0 days.

(21) Appl. No.: 13/922,408

(22) Filed: Jun. 20, 2013

(65) Prior Publication Data

US 2014/0354947 A1 Dec. 4, 2014

(30) Foreign Application Priority Data

May 29, 2013 (TW) .............................. 102118866 A

(51) Int. Cl.
*A61B 3/10* (2006.01)
*A61B 3/00* (2006.01)
(52) U.S. Cl.
USPC .......................................... 351/204; 351/246
(58) Field of Classification Search
USPC ................................................. 351/200–246
See application file for complete search history.

(56) References Cited

U.S. PATENT DOCUMENTS 7,227,976 B1 *  6/2007  Jung et al. ..................... 382/103
7,441,895 B2 * 10/2008  Akiyama et al. .............. 351/206
8,556,420 B2 * 10/2013  Sayag ............................ 351/204
8,708,494 B1 *  4/2014  Surkov et al. ................. 351/227

* cited by examiner

*Primary Examiner* — Mohammed Hasan
(74) *Attorney, Agent, or Firm* — Rosenberg, Klein & Lee

(57) ABSTRACT

Disclosed are virtual glasses try-on method and apparatus, and the apparatus includes an image capturing unit for capturing a user's image and a processing device for detecting a face image from the user's image, storing a glasses model, defining a first feature point of a lens of the glasses model and a second feature point at the center of a frame, and obtaining vertical vectors of the first and second feature points to find a third feature point. Two eye images are searched and binarized into a binarized picture that is divided into an eye area and a non-eye area. A center point between first and second extreme values is found, and vertical vectors of the first extreme value and the center point are obtained to find an example point. An affine transformation of the feature points is performed and attached to the face image to form a try-on image.

20 Claims, 16 Drawing Sheets

VIRTUAL GLASSES TRY-ON METHOD AND APPARATUS THEREOF

FIELD OF THE INVENTION

The present invention relates to a virtual glasses try-on method and an apparatus thereof, and more particularly to the virtual glasses try-on method and apparatus that attach a glass model to a correct position of a face image according to face size and eye position.

BACKGROUND OF THE INVENTION

As science and technology advance, people has an increasingly higher demand on our living quality and innovative ideas for new things, and thus glasses are not simply used for assisting people with myopia, astigmatism or presbyopia, but also tend to be a decorative item, so that the type and model of glasses are enhanced. If there are too many customers who select glasses, a salesperson is unable to serve them at the same time to provide immediate services, so that the customers have to wait for a long time. In addition, online shopping has become very popular recently, but glasses buyers can view the photos of glasses and cannot try the glasses on before buying them.

Therefore, conventional online glasses websites such as clearlycontacts provide online try-on service and offer a plurality of face frames and glasses models, so that glasses shoppers can upload one of the face frames and select their eye positions to attach a glasses model onto the face frame. However, the shoppers can only try the glasses on from a fixed viewing angle and cannot check the try-on frame from different angles of the face, and the shoppers cannot know the actual wearing condition.

In another conventional method, a glasses try-on service such as megane SUPER website is provided, wherein two face models and a glasses model are provided, or shoppers can upload a photo and edit an image to form a face model from the photo, so that shoppers can select a glasses model and attach the glasses model onto their face. In addition, parameters including the size, degree and position of the glasses model can be adjusted, and the face model and the glasses model can be rotated according to the cursor direction of a mouse, so that the shoppers can observe the situation of wearing the glasses from different angles. However, the uploaded photos have limitations, and not all photos can be edited to form a face model, and thus the rotating angle of the face model is limited, and the face image is not real. As a result, the actual situation of wearing the glasses cannot be shown.

In another conventional method, an online glasses try-on service such as DITTO website is provided, wherein the shoppers have to follow the instruction given in the webpage to shoot a video of rotating a face horizontally in order to attach a glasses model onto the face in the video. However, the recording of the video may fail easily, and the operation procedure is complicated and inconvenient, and the image of the try-on cannot be shown immediately. In addition, the angle can only accommodate the video of a horizontally rotated face, so that if a shopper raise or lower the head, then the shopper cannot view the try-on image.

In view of the aforementioned problems of the prior art, the inventor of the present invention based on years of experience in the related industry to conduct extensive researches and experiments on simulated glasses try-on method and finally invented the present invention to overcome the aforementioned problems.

SUMMARY OF THE INVENTION

Therefore, it is a primary objective of the present invention to overcome the aforementioned problems by providing a virtual glasses try-on method comprising the steps of: defining a lens as a first feature point of at least one glasses model, and defining the center of a frame as a second feature point, and obtaining a third feature point by the vertical vectors of the first feature point and the second feature point; capturing a user's image, and detecting a face image from the user's image; searching two eye images in the face image; binarizing the eye image to form a binarized picture which is divided into an eye area and a non-eye area; defining the utmost left and the utmost right ends of the eye area as a first extreme value and a second extreme value, and obtaining a center point between the first extreme value and the second extreme value; obtaining the first extreme value and the vertical vector of the center point to compute an example point; and corresponding the first feature point, the second feature point and the third feature point of one of the glasses models to the first extreme value, the center point and the example point for an affine transformation and attach the glass model to the face image to form a try-on image.

In the virtual glasses try-on method, the user's image and the try-on image are continuous dynamic images; the glasses model is attached to each frame of the user's image to form the try-on image; and the affine transformation matrix required by each frame is computed by the first feature point, the second feature point and the third feature point of the glasses model, and the first extreme value, the center point and the example point of the face image.

Wherein, the virtual glasses try-on method further comprises the steps of detecting a face image from the user's image, and including the face image into a rectangular area.

Wherein, the virtual glasses try-on method further comprises the steps of cross-dividing the rectangular area into four equal parts, and defining a feature area disposed at the two upper equal parts; and searching the eye image in the feature area.

Wherein, the virtual glasses try-on method further comprises the steps of searching the two eye feature areas in the face image, and shifting the coordinates of the eye feature area downward by one half of the height of the eye feature area, and reducing the height of the eye feature area into one-half to obtain the eye image.

Wherein, the virtual glasses try-on method further comprises the steps of converting the eye image into a gray-scale image by a RGB color space; and defining a threshold value, such that the gray-scale image is compared with the threshold value to form the binarized picture.

Wherein, the virtual glasses try-on method further comprises the steps of creating a glasses database, and storing the glasses models into the glasses database.

Wherein, the virtual glasses try-on method further comprises the steps of creating a user interface; and defining a select area and an image area at the user interface, wherein a menu of the glasses models is shown in the select area, and the user's image is shown in the image area, and when one of the glasses models is selected from the select area, the try-on image is shown in the image area.

In the virtual glasses try-on method, the select area is a rolling menu.

Wherein, the virtual glasses try-on method further comprises the steps of capturing a hand image; binarizing the hand image into a binarized hand picture, and defining a hand area and a non-hand area in the binarized hand picture; and defining the highest point of the hand area as a select point; wherein after the select point selects one of the glasses models from the select area, the try-on image is shown in the image area.

Wherein, the virtual glasses try-on method further comprises the steps of converting the hand image from into a RGB color space into a YCbCr color space; defining a Cr value and a Cb value; and comparing the hand image with the Cr value and Cb value to form the binarized hand picture.

In the virtual glasses try-on method, the Cr value and the Cb value are defined by a skin color interval value.

The present invention further provides a virtual glasses try-on apparatus, comprising: an image capturing unit, for capturing a user's image; and, a processing device, coupled to the image capturing unit, for detecting a face image from the user's image, storing at least one glasses model, defining a first feature point of one of the lenses of at least one glasses model, and a second feature point at the center of a frame of the glasses model, and obtaining a third feature point from vertical vectors of the first feature point and the second feature point, wherein after the processing device searches two eye images in the face image, the eye image is binarized to form a binarized picture, and the binarized picture is divided into an eye area and a non-eye area, and the utmost right end and a center point between a first extreme value and a second extreme value at the utmost left end of the utmost right end of the eye area respectively is found, and vertical vectors of the first extreme value and the center point are obtain to find an example point; an affine transformation of the first feature point, the second feature point and the third feature point of one of the glasses models corresponding to the first extreme value, the center point and the example point is performed, and attached to the face image to form a try-on image.

In the virtual glasses try-on apparatus, the user's image and the try-on image are continuous dynamic images; and the glasses model is attached to each frame of the user's image to form the try-on image, and the affine transformation matrix required by each frame is computed by the first feature point, the second feature point and the third feature point of the glasses model and the first extreme value, the center point and the example point of the face image.

In the virtual glasses try-on apparatus, the processing device further includes a glasses database for storing the glasses models.

The virtual glasses try-on apparatus further comprises a display unit coupled to the processing device, and the processing device having a user interface, and the display unit displaying the user interface, and the user interface having a select area and an image area, and a menu of the glasses models being shown in the select area, and the user's image being shown in the image area.

In the virtual glasses try-on apparatus, the select area is a rolling menu.

In the virtual glasses try-on apparatus, the image capturing unit further captures a hand image, binarizes the hand image into a binarized hand picture, defines a hand area and a non-hand area in the binarized hand picture, and defines the highest point of the hand area as a select point, and after the select point selects one of the glasses models in the select area, the try-on image is shown in the image area.

The virtual glasses try-on apparatus further comprises an input unit coupled to the processing device for controlling and selecting one of the glasses models in the select area to show the try-on image in the image area.

In the virtual glasses try-on apparatus, the input unit is a keyboard, a mouse or a virtual finger touch device.

In the present invention, the user's image and the try-on image are continuous dynamic images, and the glasses model is attached onto each frame of the user's image to from the try-on image, so that users can move or turn their face to view the try-on image immediately to improve the convenience of operating the virtual glasses try-on apparatus. In addition, the present invention defines the first feature point, the second feature point and the third feature point of the glasses model and obtains the vertical vectors of the first extreme value and the center point through the eye area of the binarized picture to find the example point, and performs the affine transformation of the first feature point, the second feature point and the third feature point of the glasses model corresponding to the first extreme value, the center point and the example point respectively, and attaches onto the face image, so that the rotating angle of the glasses model can be adjusted according to the angle and size of the user's face and the position and angle of the user's eyes, and the glasses model can be attached to the face image accurately. In addition, the face image is cross-divided into four equal parts, and the eye image is searched in the feature area of the two upper equal parts to improve the efficiency of searching the eyes and reduce the delay. In addition to select the glasses model by an input unit such as a keyboard and a mouse, a hand image can also be used to select the glasses model from a remote end to improve the convenience and adaptability of the operation of the present invention.

DESCRIPTION OF THE PREFERRED EMBODIMENTS

Figure 1:
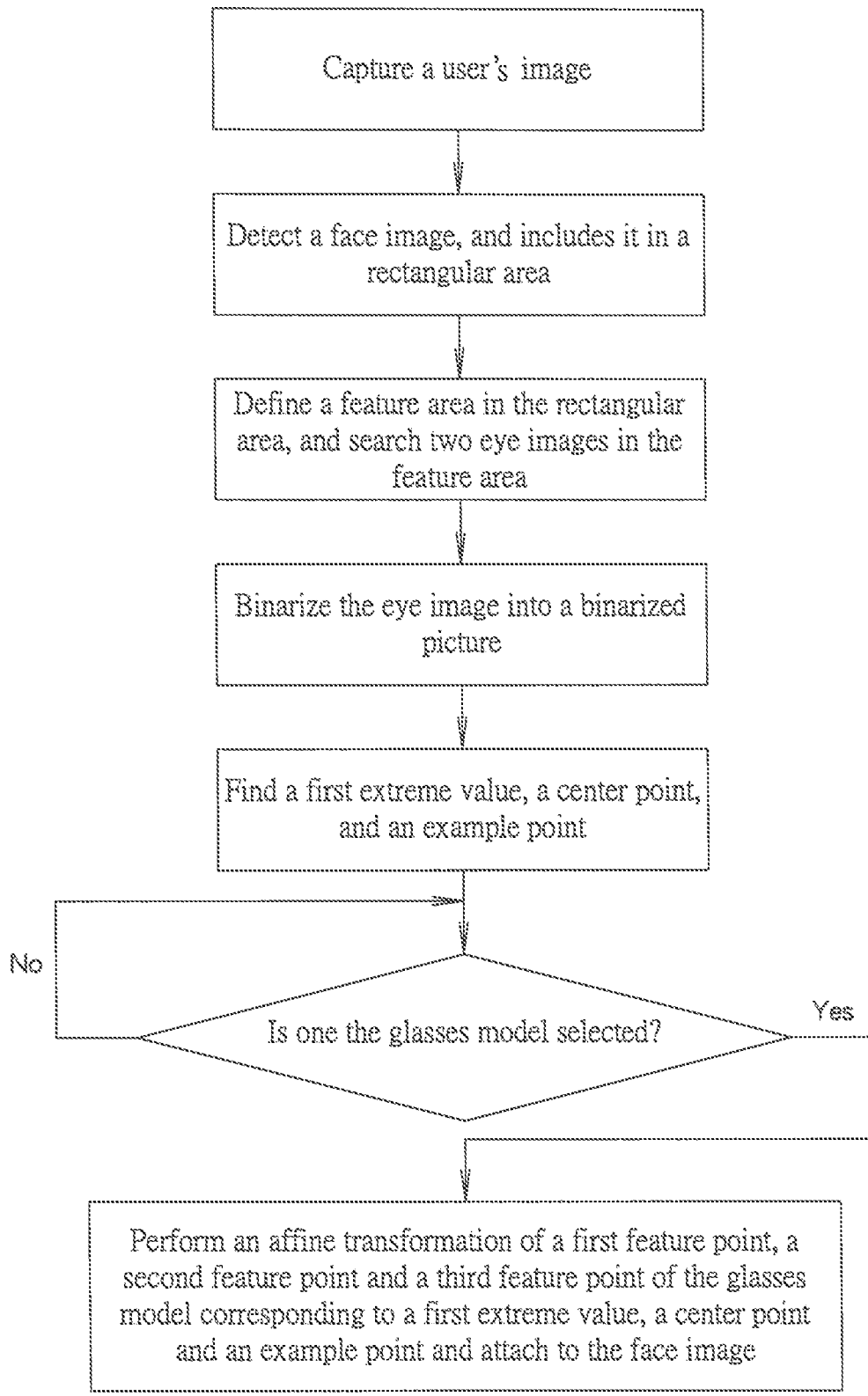
FIG. 1 is a flow chart of the method of the present invention.

The technical characteristics, contents, advantages and effects of the present invention will be apparent with the detailed description of a preferred embodiment accompanied with the illustration of related drawings as follows.

With reference to FIGS. 1 to 15 for a virtual glasses try-on apparatus in accordance with a first preferred embodiment of the present invention, the apparatus comprises: an image capturing unit 1, for capturing a user's image 2; and a processing device 3 coupled to the image capturing unit 1 for detecting a face image from the user's image 2; wherein the processing device 3 is provided for storing at least one glasses model 4, and defining a first feature point 41 of one of the lenses of the glasses model 4, a second feature point 42 at the center of a frame, and obtaining a third feature point 43 from vertical vectors of the first feature point 41 and the second feature point 42; the processing device 3 is provided for searching two eye images 22 from the face image and then binarizing the eye image 22 to form a binarized picture 23 and dividing the binarized picture 23 into an eye area 231 and a non-eye area 232; and obtaining a center point 235 between a first extreme value 233 and a second extreme value 234 at the utmost right and utmost left ends of the eye area 231 and obtaining the vertical vectors of the first extreme value 233 and the center point 235 to find an example point 236. An affine transformation of the first feature point 41, the second feature point 42 and the third feature point 43 of one of the glasses models 4 corresponding to the first extreme value 233, the center point 235 and the example point 236 respectively is performed and attached onto the face image to form a try-on image 5. The user's image 2 and the try-on image 5 are continuous dynamic images, and the glasses model 4 is attached to each frame of the user's image 2 to form the try-on image 5. An affine transformation matrix required by each frame of the glasses model 4 is computed by the first feature point 41, the second feature point 42 and the third feature point 43 of the glasses model 4 and the first extreme value 233, the center point 235 and the example point 236 of the face image.

The display unit 6 is coupled to the processing device 3 with a user interface 7, and the display unit 6 for displaying the user interface 7, and the user interface 7 includes a select area 71 and an image area 72, wherein a menu of the glasses models 4 is shown in the select area 71, and the user's image 2 is shown in the image area 72, and the select area 71 is a rolling menu. The image capturing unit 1 captures a hand image 8, binarizes the hand image 8 into a binarized hand picture 81, defines a hand area 811 and a non-hand area 812 in the binarized hand picture 81, sets the highest point of the hand area 811 as a select point 813. After the select point 813 selects one of the glasses models 4 in the select area 71, the try-on image 5 is shown in the image area 72.

Figure 2:
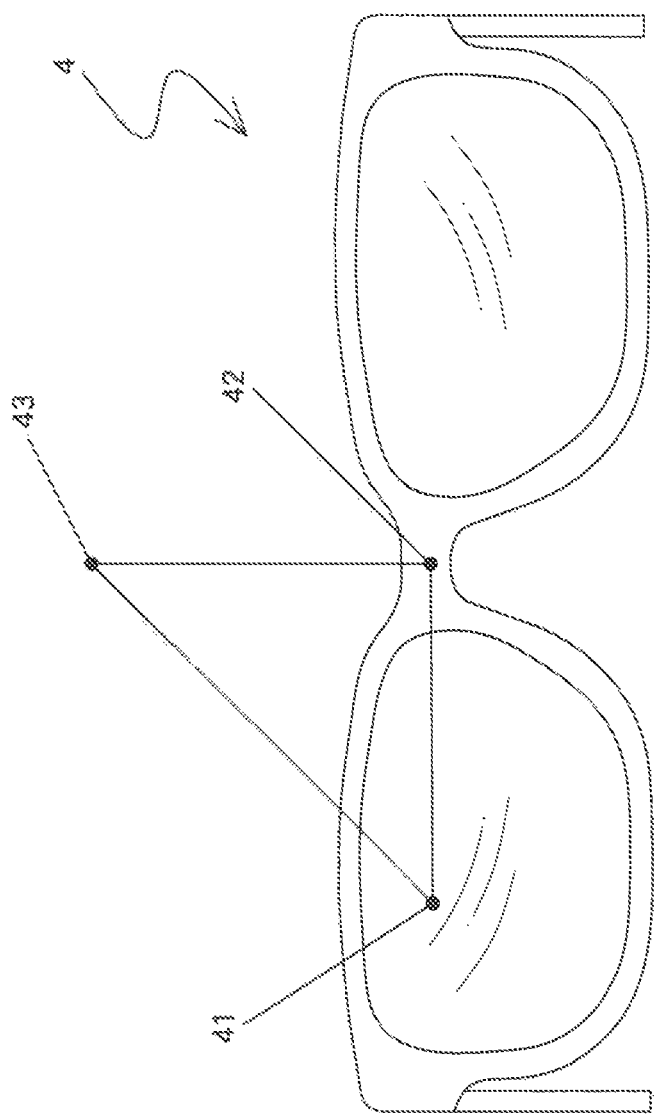
FIG. 2 is a schematic view of a first feature point, a second feature point and a third feature point defined and computed by a glass model of the present invention.

With reference to FIG. 1 for a virtual glasses try-on method of the present invention, the method comprises the following steps:

In FIG. 2, a glasses database is created, and at least one glasses model 4 is stored in the glasses database, and a first feature point 41 is defined in one of the lenses of at least one glasses model 4, and a second feature point 42 is defined at the center of a frame of the glasses model 4, and a third feature point 43 is obtained from vertical vectors of the first feature point 41 and the second feature point 42.

Figure 3:
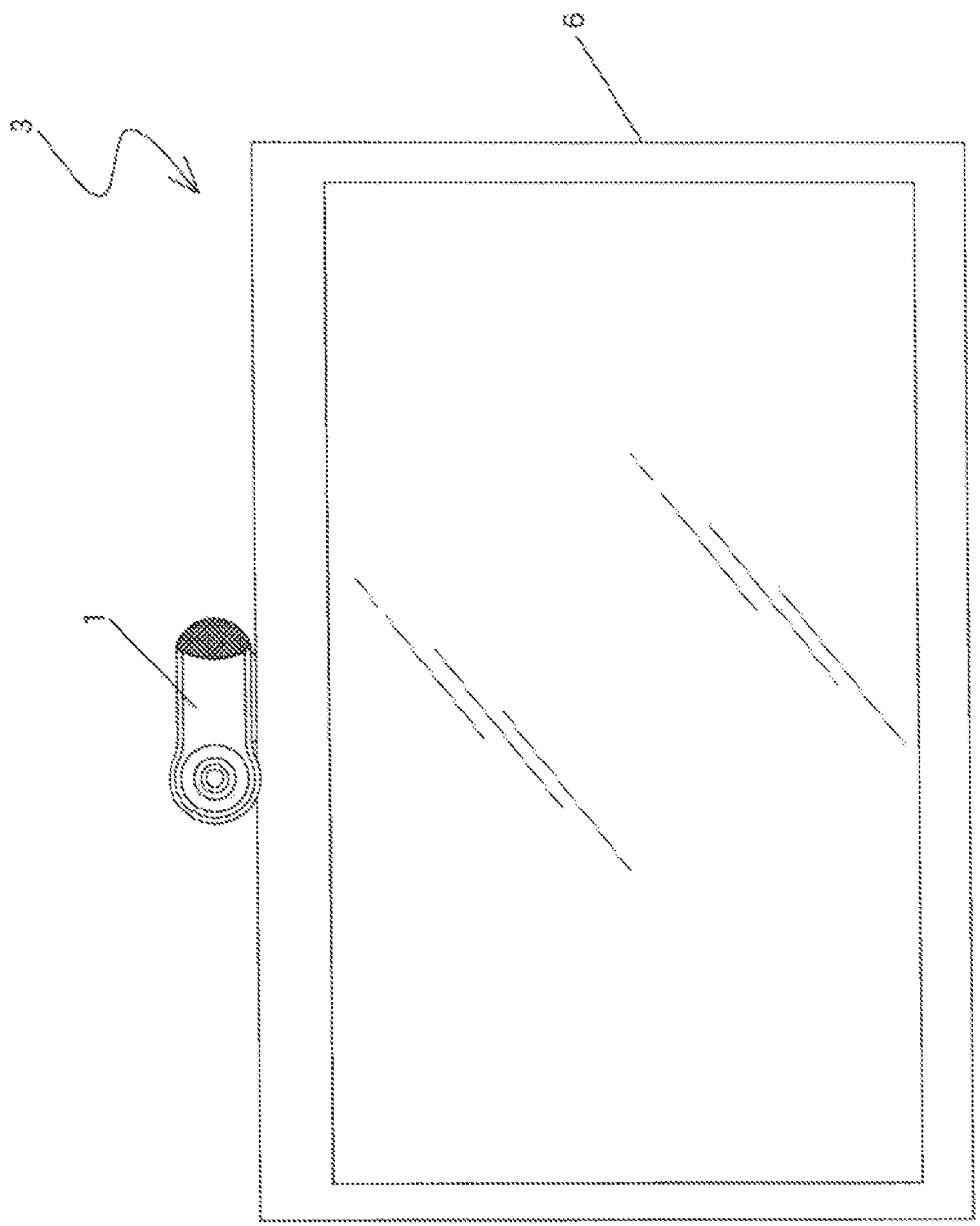
FIG. 3 is a schematic view of the apparatus of the present invention.

In FIG. 3, a user interface 7 is created, and a select area 71 and image area 72 are defined in the user interface 7, wherein a menu of the glasses models 4 is shown in the select area 71, and the select area 71 is a rolling menu. For example, the select area 71 is divided into six blocks 711, and the top block 711a and the bottom block 711b are menu switching buttons, and the remaining blocks 711c are provided for disposing different glasses models 4, and the top block 711a and the bottom block 711b are switching blocks 711c for showing the glasses models 4, and the user's image 2 is displayed in the image area 72. However, the present invention is not limited to the aforementioned arrangement only.

Figure 4:
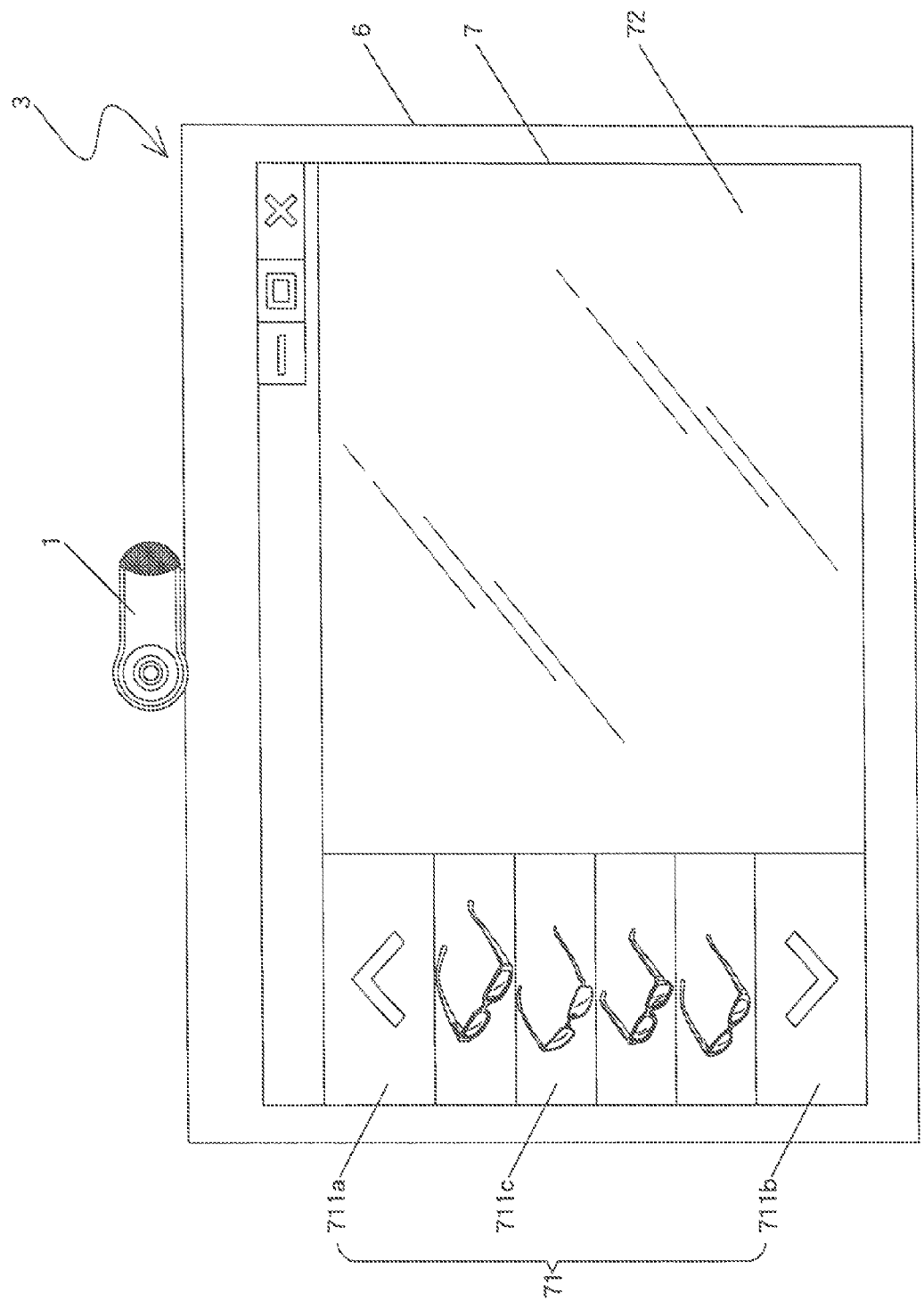
FIG. 4 is a schematic view of a display unit showing a user interface in accordance with the present invention.
Figure 5:
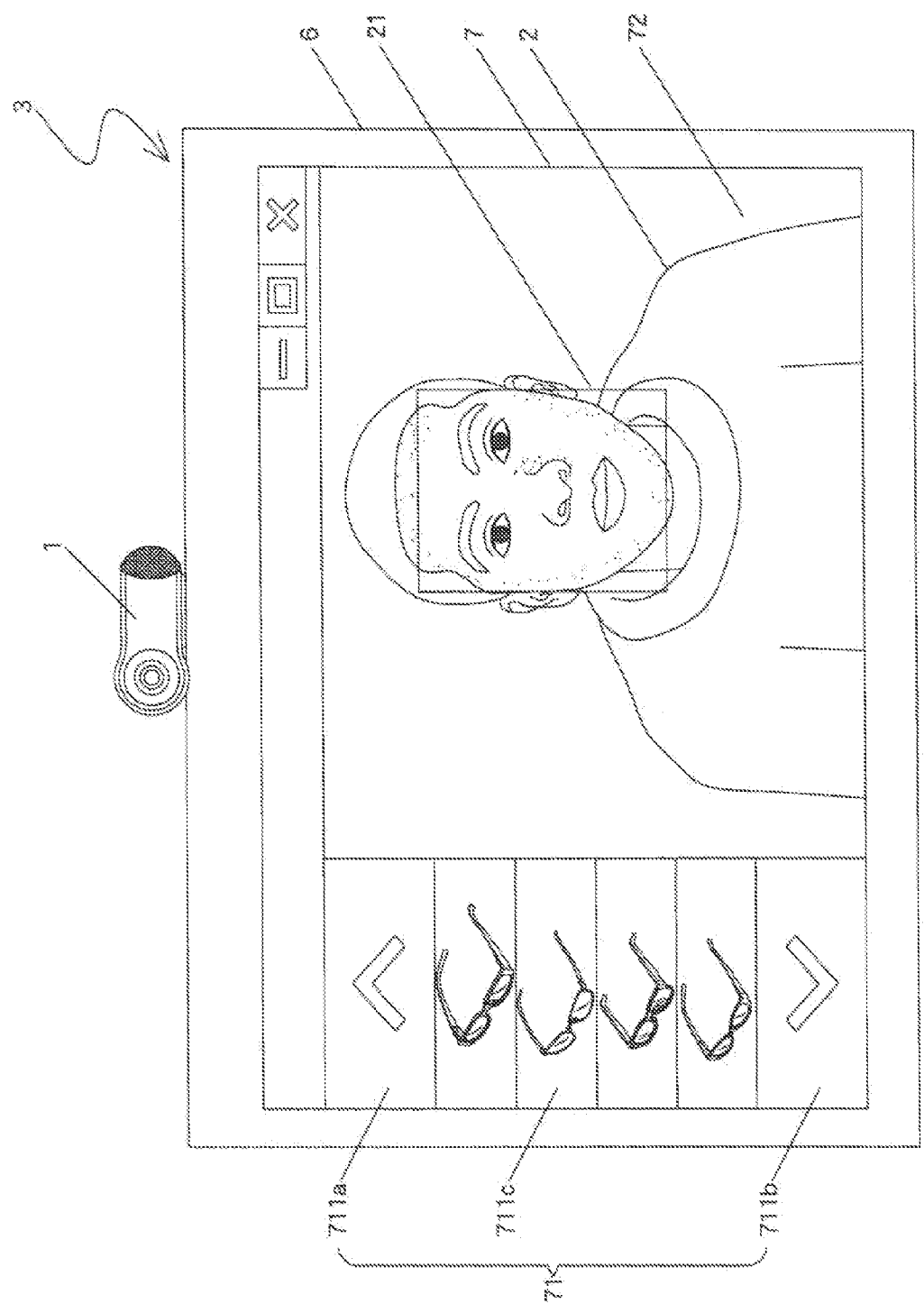
FIG. 5 is a schematic view of shooting a user's image and detecting a face image in accordance with the present invention.
Figure 6:
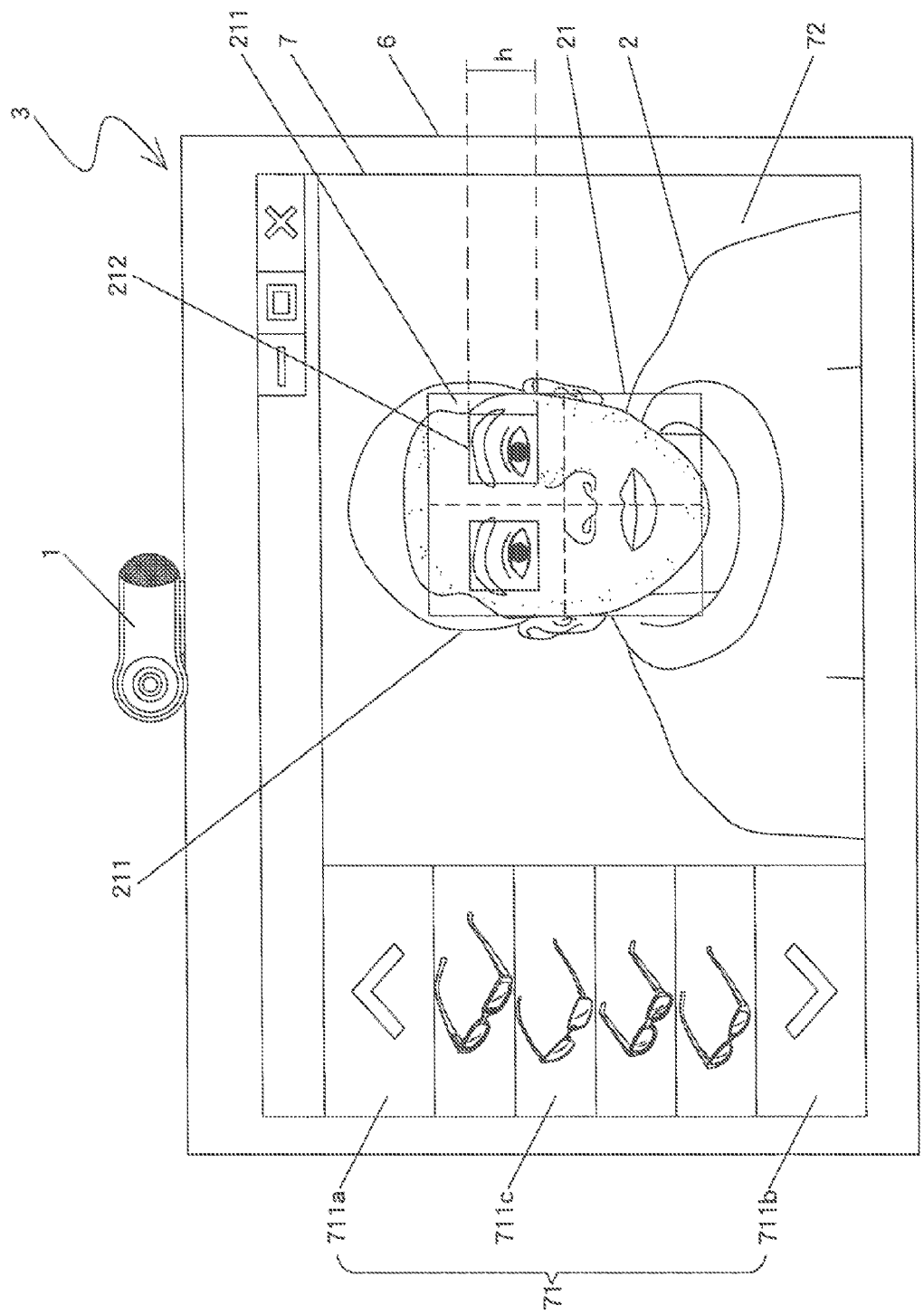
FIG. 6 is a schematic view of dividing a rectangular area into four equal parts, and setting two upper equal parts as a feature area to search an eye image in accordance with the present invention.
Figure 7:
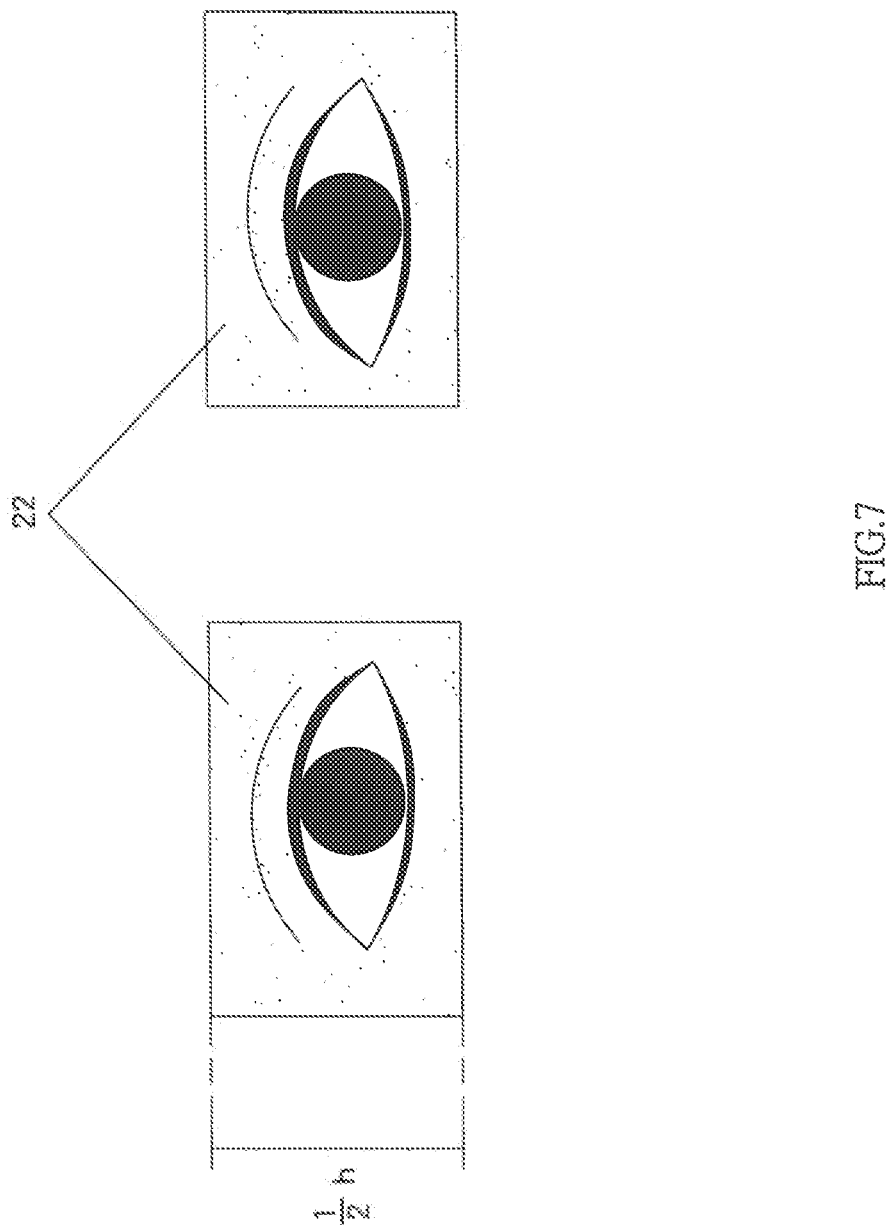
FIG. 7 is a schematic view of removing an eyebrow of an eye from an eye feature area to obtain an eye image in accordance with the present invention.
Figure 8:
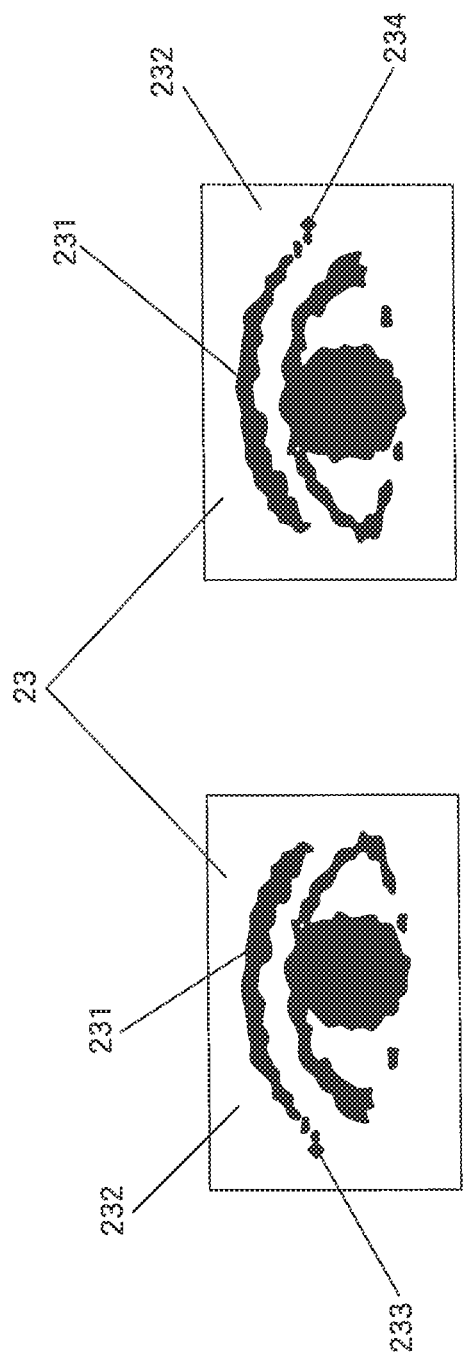
FIG. 8 is a schematic view of defining a first extreme value and a second extreme value in an eye area of a binarized picture in accordance with the present invention.
Figure 9:
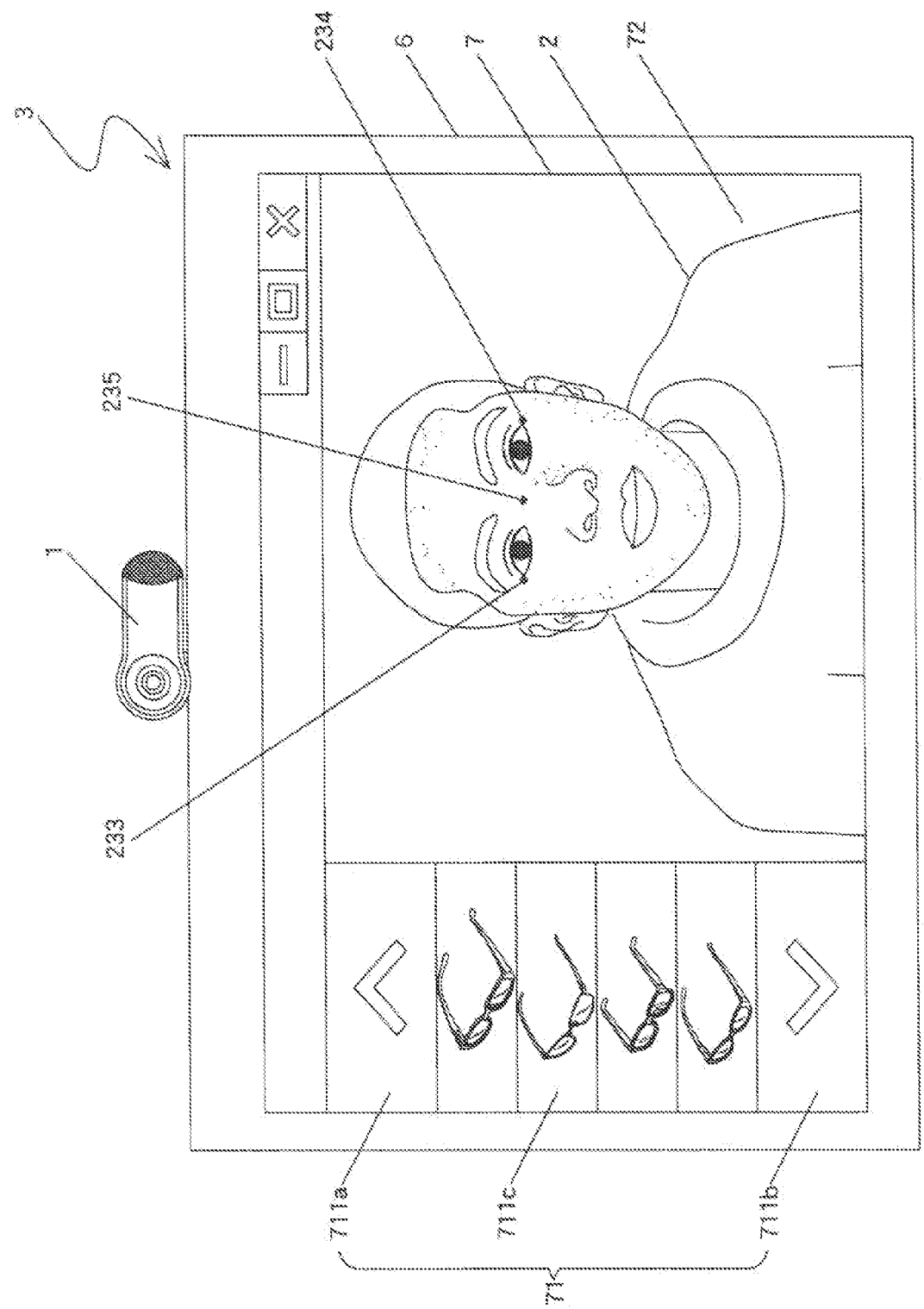
FIG. 9 is a schematic view of obtaining a center point from a first extreme value and a second extreme value in accordance with the present invention.

In FIGS. 4 and 5, the image capturing unit 1 captures a user's image 2 which is a continuous dynamic image, and an Open Source Computer Vision Library (openCV) face detector can be used for detecting a face image, and the face image is included in a rectangular area 21, and the face detector adopts Haar features as the features for the identification, and a Cascade Adaboost classifier can be used as a face features learning mechanism to train human face;

In FIG. 6, the rectangular area 21 is cross-divided into four equal parts, and two upper equal parts are defined as a feature area 211, and the Haar features are used within the feature area 211 for identifying the features, and the Cascade Adaboost classifier is used for training a left eye detector and a right eye detector to detect the positions of the eyes. Two eye feature areas 212 are searched in the feature area 211 to find two eye images 22. In other words, the range of the left eye and the right eye in a face is searched, and the eye image 22 is searched in the feature area 211 to improve the accuracy and speed of searching the eyes. In FIGS. 6 and 7, the height of the eye feature area 212 is h, and the starting coordinates my) of the eye feature area 212 is shafted downward by one-half of the height of the eye feature area 212 to define new coordinates of (x,y+½h), and the height h of the eye feature area 212 is reduced to one half which is equal to ½ h, so that the eye image 22 can be found, and an eyebrow portion of the eye is removed from the eye feature area 212;

In FIGS. 8 and 9, the eye image 22 is converted into a gray-scale image by a RGB color space, and a threshold value is defined, and the gray-scale image is compared with the threshold value, and the eye image 22 is binarized into a binarized picture 23 which is divided into an eye area 231 and a non-eye area 232. The utmost left end and the utmost right end of the eye area 231 are defined as a first extreme value 233 and a second extreme value 234 respectively and used for finding the positions of the external eye corners of the left eye and right eye and finding a center point 235 between the first extreme value 233 and the second extreme value 234.

Figure 10:
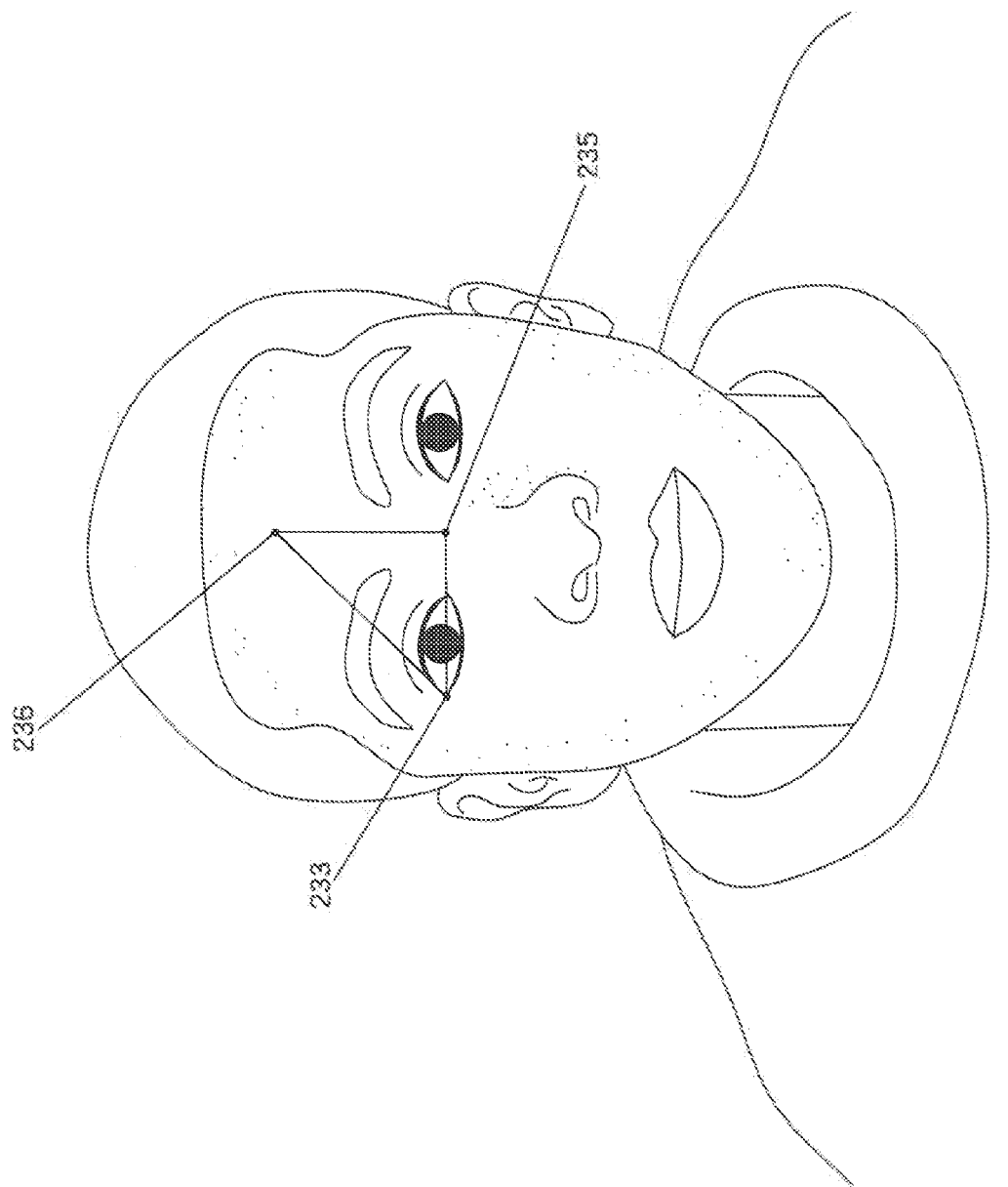
FIG. 10 is a schematic view of obtaining an example point in accordance with the present invention.
Figure 11:
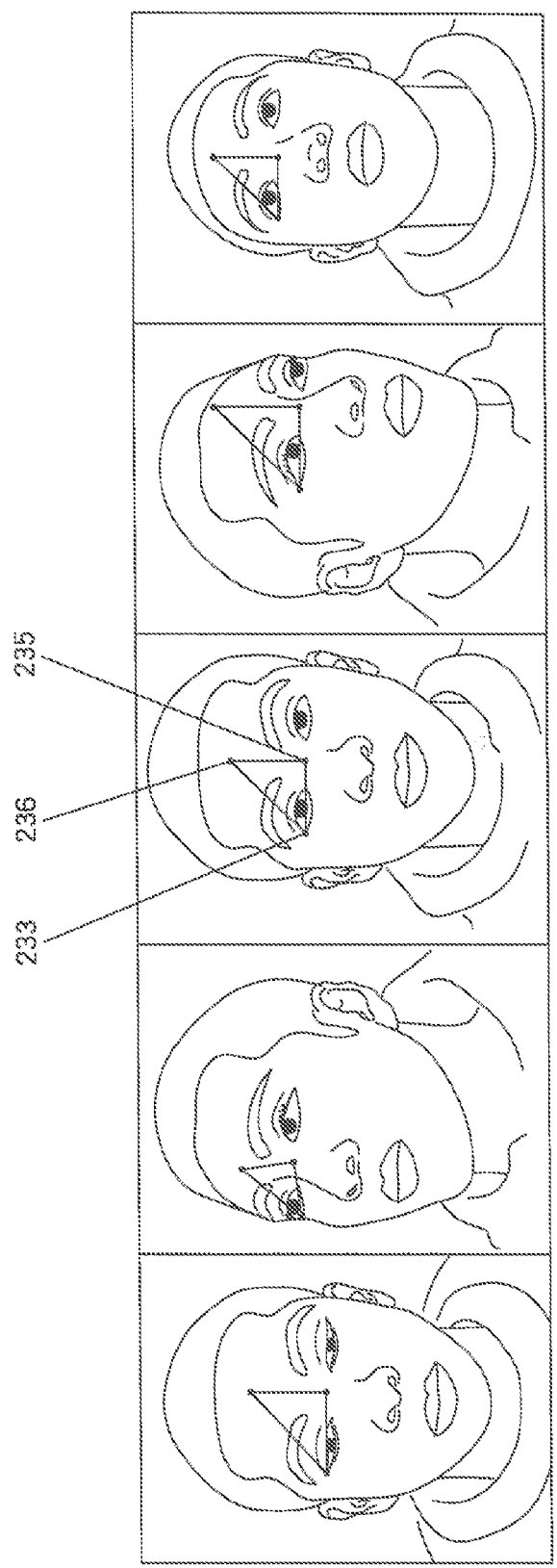
FIG. 11 is a schematic view of first extreme values, center points and example points a face image at different angles in accordance with the present invention.

In FIG. 10, vertical vectors of the first extreme value 233 and the center point 235 are obtained to find an example point 236. Assumed that $(a_1,a_2)$ represents the coordinates of the first extreme value 233, and $(b_1,b_2)$ represents the coordinates of the center point 235 are, and $(c_1,c_2)$ represents the coordinates of the example point 236, the example point 236 has the coordinates $(c_1,c_2)=(b_1-b_2+a_2, b_1+b_2-a_1)$. In FIG. 11, the first extreme value 233, the center point 235 and the example point 236 of a face images at different angles can be defined or obtained.

Figure 12:
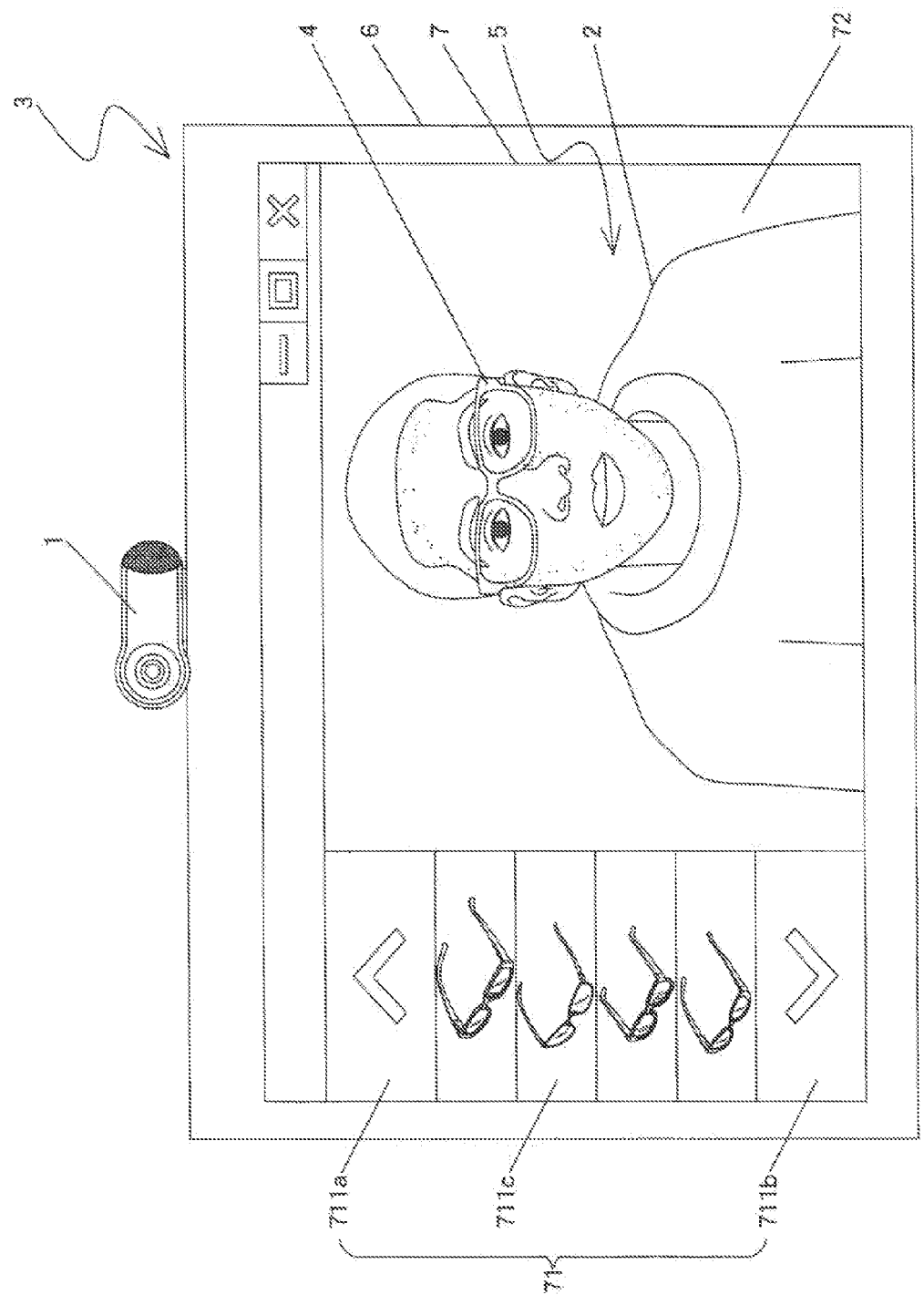
FIG. 12 is a schematic view of attaching a glasses model to a face image in accordance with the present invention when a select point is superimposed onto a block.

In FIG. 12, after one of the glasses models 4 is selected from the select area 71, an affine transformation of the first feature point 41, the second feature point 42 and the third feature point 43 of the glasses model 4 shown in the block 711 corresponding to the first extreme value 233, the center point 235 and the example point 236 respectively is performed. For example, the coordinates (x,y) of the affine transformation are converted into the coordinates (x',y') as follows:

$$x'=ax+by+c;$$

$$y'=dx+ey+f;$$

$$b=Ah;$$

$$h=(A^T A)^{-1} A^T b;$$

Wherein, A is a n×n real matrix; b is a n dimensional real vector, and h is an affine transformation matrix, and the affine transformation matrix can be used to find a, b, c, d, e and f, so that if the coordinates of the first feature point 41, the second feature point 42 and the third feature point 43 are $(x_1,y_1)$, $(x_2,y_2)$ and $(x_3, y_3)$ respectively, the coordinates of the first extreme value 233, the center point 235 and the example point 236 are $(x'_1,y'_1)$, $(x'_2,y'_2)$ and $(x'_3,y'_3)$ respectively. The first feature point 41, the second feature point 42 and the third feature point 43 of the glasses model 4 are substitute into the following matrix:

$$\begin{bmatrix} x'_1 \\ y'_1 \\ x'_2 \\ y'_2 \\ x'_3 \\ y'_3 \end{bmatrix} = \begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ x_3 & y_3 & 1 & 0 & 0 & 0 \\ 0 & 0 & 0 & x_3 & y_3 & 1 \end{bmatrix} \begin{bmatrix} a \\ b \\ c \\ d \\ e \\ f \end{bmatrix}$$

Figure 13:
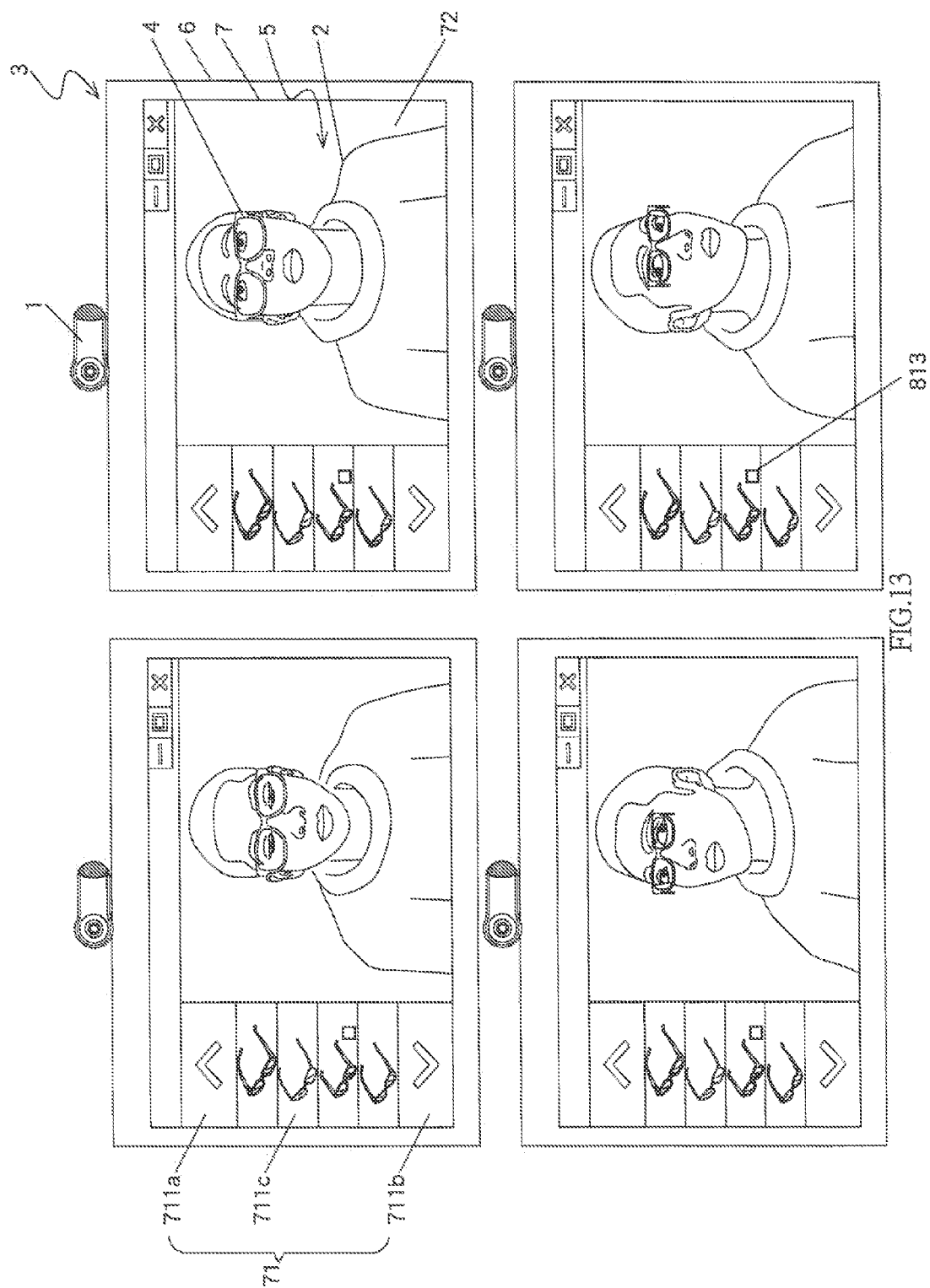
FIG. 13 is a schematic view of a try-on image of a face image at different angles in accordance with the present invention.

Therefore, the first extreme value 233, the center point 235 and the example point 236 of the glasses model 4 is transformed by the affine transformation into the angle and position of the face image, and the glasses model 4 can be attached to the face image accurately to form a try-on image 5, and the try-on image 5 can be shown in the image area 72, wherein the try-on image 5 is a continuous dynamic image, and the glasses model 4 is attached to each frame of the user's image 2 to form the try-on image 5, and the affine transformation matrix required by each frame is computed by the first feature point 41, the second feature point 42 and the third feature point 43 of the glasses model 4 and the first extreme value 233, the center point 235 and the example point 236 of the face image in each frame, so that users can move or turn their face to view the try-on image 5 immediately and improve the convenience of operating the virtual glasses try-on apparatus of the present invention. In FIG. 13, the present invention can attach the glasses model 4 to a face image with different angles and positions to improve the convenience and adaptability, so that users can check the actual wearing conditions from different angles on their own without requiring the assistance of a service personnel, so as to improve the efficiency of trying and selecting the glasses.

Figure 14:
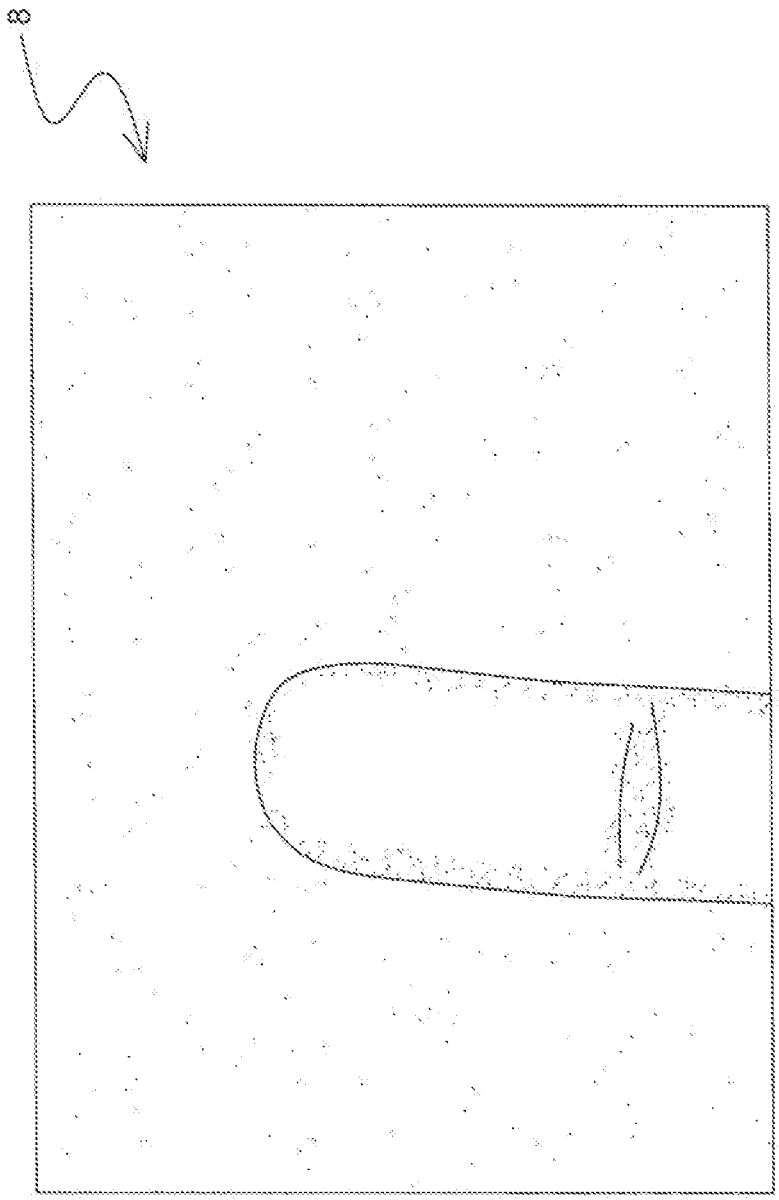
FIG. 14 is a schematic view of a hand image of the present invention.

In FIG. 14, after one of the glasses models 4 is selected from the select area 71, the image capturing unit 1 captures a hand image 8, and the hand image 8 is converted from a RGB color space into a YCbCr color space which is not affected by brightness easily, and the background color of the image capturing unit 1 is defined as green to reduce the chance of an incorrect detection.

Further, a Cr value and a Cb value are defined, and the hand image 8 is compared with the Cr value and Cb value, and the hand image 8 is binarized into a binarized hand picture 81, and a hand area 811 and a non-hand area 812 are defined in the binarized hand picture 81, and the Cr value and the Cb value are defined by a skin color interval value as follows $$\mathrm{Skin}(x, y) = \begin{cases} 1 & 97.5 \leq Cb(x, y) \leq 142.5 \ \& \ 134 \leq Cr(x, y) \leq 176 \\ 0 & \text{otherwise} \end{cases}$$

Figure 15:
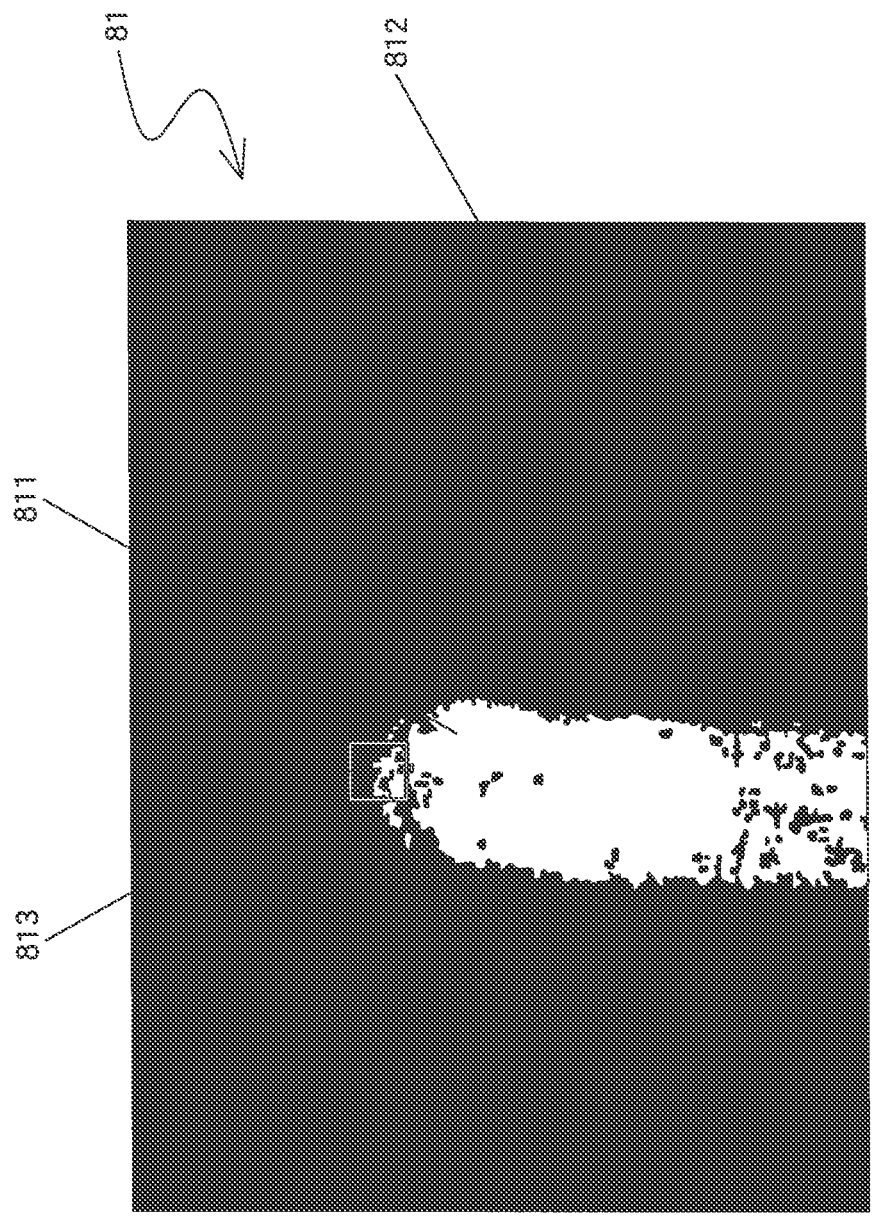
FIG. 15 is a schematic view of a binarized hand picture of the present invention.

In FIG. 15, the skin color of the hand image 8 is white in the binarized hand picture 81. In other words, the white color represents the hand area 811. On the other hand, the non-skin color of the hand image 8 is black in the binarized hand picture 81. In other words, the black color represents the non-hand area 812. The highest point of the hand area 811 is defined as a select point 813. In FIGS. 12 and 13, if one of the blocks 711 in the select area 71 of the select point 813 is superimposed, the try-on image 5 is shown in the image area 72.

Figure 16:
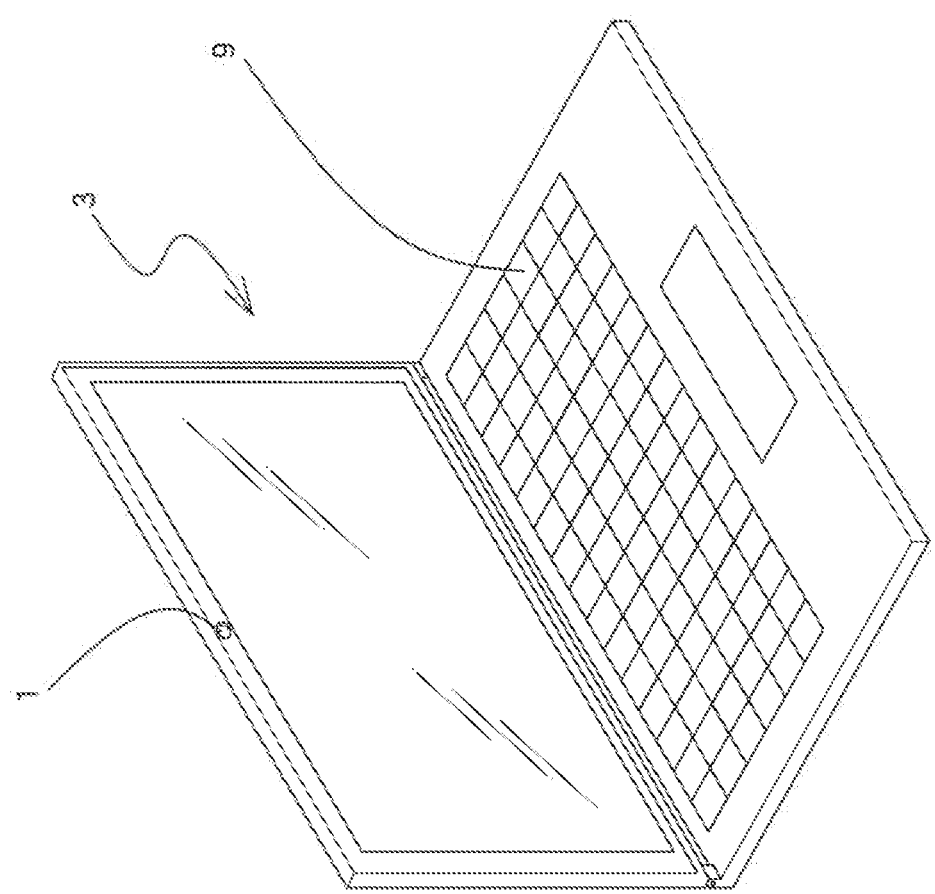
FIG. 16 is a schematic view of a second preferred embodiment of the present invention second.

With reference to FIG. 16 for a second preferred embodiment of the present invention, the difference between the second preferred embodiment and the first preferred embodiment resides on that the second preferred embodiment further comprises an input unit 9 which can be a keyboard, a mouse or a virtual finger touch device, and the input unit 9 is coupled to the processing device 3 and operated for selecting one of the glasses models 4 from the select area 71, such that the try-on image 5 is shown in the image area 72. The input unit 9 improves the convenience of the operation and the adaptability of the present invention.

The invention claimed is:

1. A virtual glasses try-on method, comprising the steps of:
   defining a first feature point of one lens of a pair of lenses of at least one glasses model, and a second feature point at a center of a frame of the glasses model, and obtaining a third feature point at an intersection of vertical vectors of the first feature point and the second feature point;
   capturing a user's image, and detecting a face image from the user's image;
   searching two eye images in the face image;
   binarizing the eye image to form a binarized picture, and dividing the binarized picture into an eye area and a non-eye area;
   defining an utmost right end and an utmost left end of the eye area as a first extreme value and a second extreme value respectively, and finding a center point between the first extreme value and the second extreme value;
   obtaining an intersection of vertical vectors of the first extreme value and the center point to find an example point; and
   performing an affine transformation of the first feature point, the second feature point and the third feature point of the at least one glasses model respectively corresponding to the first extreme value, the center point and the example point and superimpose the at least one glasses model onto the face image to form a try-on image.

2. The virtual glasses try-on method of claim 1, wherein the user's image and the try-on image are continuous dynamic images, and the at least one glasses model is superimposed in each frame of the user's image to form the try-on image, and an affine transformation matrix required by each frame is computed with relation to a respective correspondence between the first feature point, the second feature point and the third feature point of the at least one glasses model and the first extreme value, the center point and the example point of the face image.

3. The virtual glasses try-on method of claim 1, further comprising the steps of detecting a face image from the user's image, and including the face image into a rectangular area.

4. The virtual glasses try-on method of claim 3, further comprising the steps of cross-dividing the rectangular area into four equal parts, defining a feature area disposed at the two upper equal parts, and searching the eye image in the feature area.

5. The virtual glasses try-on method of claim 1, further comprising the steps of searching the two eye feature areas in the face image, shifting the coordinates of the eye feature area downward by one half of the height of the eye feature area, and reducing the height of the eye feature area into one-half to obtain the eye image.

6. The virtual glasses try-on method of claim 1, further comprising the steps of converting the eye image into a gray-scale image by a RGB color space, and
defining a threshold value, so that the gray-scale image can be compared with the threshold value to form the binarized picture.

7. The virtual glasses try-on method of claim 1, further comprising the steps of creating a glasses database, and storing a plurality of glasses models into the glasses database.

8. The virtual glasses try-on method of claim 1, further comprising the steps of creating a user interface, and defining a select area and an image area at the user interface, wherein a menu of glasses models is shown in the select area, and the user's image is shown in the image area, and when one of the glasses models shown in the select area is selected, the try-on image is shown in the image area.

9. The virtual glasses try-on method of claim 1, wherein the select area is a rolling menu.

10. The virtual glasses try-on method of claim 8, further comprising the steps of:
capturing a hand image;
binarizing the hand image into a binarized hand picture, and defining a hand area and a non-hand area in the binarized hand picture; and
defining the highest point of the hand area as a select point;
wherein after the select point selects one of the glasses models from the select area, the try-on image is shown in the image area.

11. The virtual glasses try-on method of claim 10, further comprising the steps of:
converting the hand image from into a RGB color space into a YCbCr color space;
defining a Cr value and a Cb value; and
comparing the hand image with the Cr value and Cb value to form the binarized hand picture.

12. The virtual glasses try-on method of claim 11, wherein the Cr value and the Cb value are defined by a skin color interval value.

13. A virtual glasses try-on apparatus, comprising:
an image capturing unit, for capturing a user's image, the user's image including eye images in a face image portion of the user's image; and,
a processing device, coupled to the image capturing unit, for receiving the user's image therefrom and detecting the face image portion from the received user's image, the processing device stores at least one glasses model, and is configured to establish a first feature point of one lens of a pair of lenses of the at least one glasses model, establish a second feature point at a center of a frame of the glasses model, and obtain a third feature point from an intersection of vertical vectors of the first feature point and the second feature point, the processing device being configured to search for two eye images in the face image portion, binarizing the eye image to form a binarized picture, and dividing the binarized picture into an eye area and a non-eye area, the processing device being configured to locate an utmost end and a center point of the eye area, and define an intersection of vertical vectors of the utmost end and the center point to define an example point; the processing device being configured to perform an affine transformation of the first feature point, the second feature point and the third feature point of the at least one glasses model to respectively correspond to the utmost end, the center point and the example point to superimpose the at least one glasses model on the face image to form a try-on image for display.

14. The virtual glasses try-on apparatus of claim 13, wherein the user's image and the try-on image are continuous dynamic images; and the at least one glasses model is superimposed in each frame of the user's image to form the try-on image, and the processing device is configured to establish an affine transformation matrix required by each frame with relation to a respective correspondence between the first feature point, the second feature point and the third feature point of the at least one glasses model and the utmost end, the center point and the example point of the face image.

15. The virtual glasses try-on apparatus of claim 13, wherein the processing device further includes a glasses database for storing a plurality of glasses models therein.

16. The virtual glasses try-on apparatus of claim 13, further comprising a display unit coupled to the processing device, the processing device being configured to generate a user interface, and the display unit displaying the user interface, wherein the user interface has a select area and an image area, a menu of a plurality of glasses models being shown in the select area, and the user's image being shown in the image area.

17. The virtual glasses try-on apparatus of claim 16, wherein the select area is a rolling menu.

18. The virtual glasses try-on apparatus of claim 16, wherein responsive to the image capturing unit capturing a hand image, the processing device being configured to binarize the hand image into a binarized hand picture, define a hand area and a non-hand area in the binarized hand picture, and define a highest point of the hand area as a select point, and the processing device being configured to thereafter recognize the select point to select one of the plurality glasses models shown in the select area to be shown in the try-on image in the image area.

19. The virtual glasses try-on apparatus of claim 16, further comprising an input unit coupled to the processing device for controlling and selecting one of the plurality of glasses models shown in the select area to to be shown in the try-on image in the image area.

20. The virtual glasses try-on apparatus of claim 19, wherein the input unit is a keyboard, a mouse or a virtual finger touch device.

* * * * *